(12) United States Patent
Vasanth et al.

(10) Patent No.: US 9,971,823 B2
(45) Date of Patent: May 15, 2018

(54) DYNAMIC REPLICA FAILURE DETECTION AND HEALING

(71) Applicant: Amazon Technologies, Inc., Seattle, WA (US)

(72) Inventors: Jai Vasanth, Seattle, WA (US); Barry Bailey Hunter, Jr., Sammamish, WA (US); Kiran-Kumar Muniswamy-Reddy, Seattle, WA (US); David Alan Lutz, Renton, WA (US); Jian Wang, Bellevue, WA (US); Maximiliano Maccanti, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 25 days.

(21) Appl. No.: 15/090,547

(22) Filed: Apr. 4, 2016

(65) Prior Publication Data

US 2016/0292249 A1    Oct. 6, 2016

Related U.S. Application Data

(63) Continuation of application No. 13/917,317, filed on Jun. 13, 2013, now Pat. No. 9,304,815.

(51) Int. Cl.
*G06F 17/30* (2006.01)
*G06F 11/07* (2006.01)
(Continued)

(52) U.S. Cl.
CPC ...... *G06F 17/30575* (2013.01); *G06F 3/0617* (2013.01); *G06F 9/4881* (2013.01);
(Continued)

(58) Field of Classification Search
CPC ........... G06F 17/30575; G06F 11/0709; G06F 11/0793; G06F 11/006; G06F 3/0617;
(Continued)

(56) References Cited

U.S. PATENT DOCUMENTS 5,089,970 A    2/1992  Lee et al.
5,491,823 A    2/1996  Ruttenberg
(Continued)

FOREIGN PATENT DOCUMENTS

GB    2444342    6/2008

OTHER PUBLICATIONS

Li et al., Practical Byzantine Fault Tolerance Using Fewer than 3f+1 Active Replicas, in Proceedings of the 17th International Conference on Parallel and Distributed Computing Systems, San Francisco, California, pp. 241-247, Sep. 2004. (Year: 2004).*
(Continued)

*Primary Examiner* — Phuong Thao Cao
(74) *Attorney, Agent, or Firm* — Robert C. Kowert; Meyertons, Hood, Kivlin, Kowert & Goetzel, P.C.

(57) ABSTRACT

Detecting replica faults within a replica group and dynamically scheduling replica healing operations are described. Status metadata for one or more replica groups may be accessed. Based, at least in part, the status data a number of available replicas for at least one replica group may be determined to incompliant with a healthy state definition for the replica group. One or more healing operations to restore the number of available replicas for the at least one replica group to the respective healthy state definition may be dynamically scheduled. In some embodiments, one or more resource constraints for performing healing operations and one or more resource requirements for each of the one or more healing operations may be used to order the one or more healing operations.

20 Claims, 7 Drawing Sheets

(51) Int. Cl.
  *G06F 9/48* (2006.01)
  *G06F 3/06* (2006.01)
  *G06F 11/00* (2006.01)
  *H04L 29/08* (2006.01)

(52) U.S. Cl.
  CPC ............ *G06F 11/006* (2013.01); *G06F 11/07* (2013.01); *G06F 11/0709* (2013.01); *G06F 11/0793* (2013.01); *H04L 67/1095* (2013.01); *G06F 2201/86* (2013.01)

(58) Field of Classification Search
  CPC .... G06F 11/07; G06F 9/4881; G06F 2201/86; H04L 67/1095
  USPC .......................................................... 707/679
  See application file for complete search history.

(56) References Cited

U.S. PATENT DOCUMENTS

| | | | |
|---|---|---|---|
| 5,941,999 A | 8/1999 | Matena et al. | |
| 5,963,944 A * | 10/1999 | Adams .............. | G06F 17/30206 |
| 6,014,669 A * | 1/2000 | Slaughter .......... | G06F 17/30581 |
| | | | 707/610 |
| 6,671,821 B1 | 12/2003 | Castro et al. | |
| 7,702,667 B2 | 4/2010 | Yahalom et al. | |
| 7,831,550 B1 | 11/2010 | Pande et al. | |
| 8,117,155 B2 * | 2/2012 | Chen ................. | G06F 17/30581 |
| | | | 707/637 |
| 8,386,540 B1 | 2/2013 | McAlister et al. | |
| 8,392,312 B2 | 3/2013 | Batsakis et al. | |
| 8,392,482 B1 | 3/2013 | McAlister et al. | |
| 8,423,731 B1 | 4/2013 | Nadathur et al. | |
| 8,468,132 B1 | 6/2013 | O'Neill et al. | |
| 8,554,762 B1 | 10/2013 | O'Neill et al. | |
| 9,015,724 B2 | 4/2015 | Druyan | |
| 9,304,815 B1 | 4/2016 | Vasanth et al. | |
| 9,659,031 B2 * | 5/2017 | Zunger ............. | G06F 17/30215 |
| 2002/0055972 A1 * | 5/2002 | Weinman, Jr. ....... | G06F 11/2058 |
| | | | 709/203 |
| 2003/0167270 A1 * | 9/2003 | Werme ..................... | G06F 9/06 |
| 2003/0208511 A1 | 11/2003 | Earl et al. | |
| 2004/0059805 A1 * | 3/2004 | Dinker ................ | G06F 11/2069 |
| | | | 709/223 |
| 2004/0078637 A1 | 4/2004 | Fellin et al. | |
| 2004/0139083 A1 | 7/2004 | Hahn et al. | |
| 2005/0039069 A1 | 2/2005 | Prahlad et al. | |
| 2006/0020754 A1 | 1/2006 | Suzuki et al. | |
| 2006/0090095 A1 | 4/2006 | Massa et al. | |
| 2006/0098017 A1 | 5/2006 | Tarditi, Jr. et al. | |
| 2006/0098019 A1 | 5/2006 | Tarditi, Jr. et al. | |
| 2006/0101200 A1 | 5/2006 | Doi | |
| 2006/0253504 A1 | 11/2006 | Lee et al. | |
| 2007/0156842 A1 * | 7/2007 | Vermeulen ........ | G06F 17/30212 |
| | | | 709/217 |
| 2007/0174697 A1 | 7/2007 | Saridakis et al. | |
| 2007/0208780 A1 * | 9/2007 | Anglin ................ | G06F 11/1469 |
| 2007/0282915 A1 | 12/2007 | Vosshall et al. | |
| 2008/0052327 A1 | 2/2008 | Buah | |
| 2008/0086483 A1 * | 4/2008 | Park .................. | G06F 17/30233 |
| 2008/0126404 A1 | 5/2008 | Slik et al. | |
| 2008/0288646 A1 | 11/2008 | Hasha et al. | |
| 2009/0037451 A1 | 2/2009 | Borrill | |
| 2009/0113434 A1 | 4/2009 | Podila | |
| 2009/0210455 A1 | 8/2009 | Sarkar et al. | |
| 2009/0216796 A1 | 8/2009 | Slik et al. | |
| 2009/0254774 A1 | 10/2009 | Chamdani et al. | |
| 2009/0307329 A1 * | 12/2009 | Olston .............. | G06F 17/30212 |
| | | | 709/214 |
| 2010/0023564 A1 * | 1/2010 | Yerneni ............... | G06F 11/1662 |
| | | | 707/E17.007 |
| 2010/0131545 A1 * | 5/2010 | Srivastava ........ | G06F 17/30575 |
| | | | 707/769 |
| 2010/0235840 A1 | 9/2010 | Angaluri | |
| 2010/0262717 A1 | 10/2010 | Critchley et al. | |
| 2010/0299309 A1 | 11/2010 | Maki et al. | |
| 2011/0055843 A1 | 3/2011 | Keeton et al. | |
| 2011/0099420 A1 | 4/2011 | MacDonald McAlister et al. | |
| 2011/0125704 A1 * | 5/2011 | Mordvinova ..... | G06F 17/30581 |
| | | | 707/600 |
| 2011/0138486 A1 * | 6/2011 | White ..................... | G06F 21/10 |
| | | | 726/30 |
| 2011/0153930 A1 | 6/2011 | Serizawa et al. | |
| 2011/0196664 A1 * | 8/2011 | Zunger ............. | G06F 17/30215 |
| | | | 703/21 |
| 2012/0166390 A1 | 6/2012 | Merriman et al. | |
| 2012/0197868 A1 | 8/2012 | Fauser et al. | |
| 2012/0254119 A1 | 10/2012 | Kumarasamy et al. | |
| 2012/0284229 A1 * | 11/2012 | Kim .................... | H04L 67/1095 |
| | | | 707/634 |
| 2013/0097130 A1 * | 4/2013 | Bingol .............. | G06F 17/30578 |
| | | | 707/694 |
| 2014/0095813 A1 | 4/2014 | Shukla et al. | |
| 2014/0101298 A1 | 4/2014 | Shukla et al. | |
| 2014/0143205 A1 * | 5/2014 | Leshchiner ....... | G06F 17/30575 |
| | | | 707/626 |
| 2014/0365658 A1 | 12/2014 | Lang et al. | |

OTHER PUBLICATIONS

Costache et al., "Semias: Self-Healing Active Replication on Top of a Structured Peer-to-Peer Overlay", In Proceedings of the 2010 29th IEEE International Symposium on Reliable Distributed Systems, 2010, pp. 235-244.

Frincu et al., "Self-Healing Distributed Scheduling Platform", In Proceedings of the 2011 11th IEEE/ACM International Symposium on Cluster, Cloud and Grid Computing, pp. 225-234, 2011.

Silva et al., "Self-Healing of Operational Workflow Incidents on Distributed Computing Infrastructures", In Proceedings of the 2012 12th IEEE/ACM International Symposium on Cluster, Cloud and Grid Computing, pp. 318-325, 2012.

Tian et al., "Probabilistic Failure Detection for Efficient Distributed Storage Maintenance", In Proceedings of the 2008 IEEE Symposium on Reliable Distributed Systems, pp. 147-156, 2008.

Baker et al., "Megastore: Providing Scalable, Highly Available Storage for Interactive Services", the 5th Biennial Conference on Innovative Data Systems Research (CIDR' 11 ), Jan. 9-12, 2011, Asilomar, California, USA, pp. 223-234.

Chun et al., "Efficient Replica Maintenance for Distributed Storage Systems", in NSDI, 2006, 14 pages.

Mccue et al., "Computing Replica Placement in Distributed Systems", In Proceedings of the IEEE Second Workshop on Replicated Data, Monterey, Nov. 1992, 4 pages.

Noor et al., "Failure Recovery Mechanism in Neighbor Replica Distribution Architecture", ICICA 2010, LNCS 6377, pp. 41-48, 2010.

Debanjan Ghosh, Raj Sharman, H. Raghav Rao, Shambhu Upadhyaya, Self-healing systems—survey and synthesis, Decision Support Systems, vol. 42 Issue 4, Jan. 2007, pp. 2164-2185.

* cited by examiner

DYNAMIC REPLICA FAILURE DETECTION AND HEALING

This application a continuation of U.S. patent application Ser. No. 13/917,317, filed Jun. 13, 2013, now U.S. Pat. No. 9,304,815, which is hereby incorporated by reference herein in it's entirety.

BACKGROUND

Several leading technology organizations are investing in building technologies that sell "software-as-a-service". Such services provide access to shared storage, for example, database systems, and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may distribute and/or replicate that data across two or more machines, often in different locations, for any of a number of reasons, including security issues, disaster prevention and recovery issues, data locality and availability issues, etc. These machines may be configured in any number of ways, including as a shared resource pool. Interaction between client applications and database servers typically includes read operations, write operations, and update operations.

Further, insuring the durability and reliability of data, which may include monitoring and restoring the stored data, is difficult to achieve without human intervention.

DETAILED DESCRIPTION OF EMBODIMENTS

Various embodiments of systems and methods are disclosed for implementing a data storage service for providing a high level of durability and availability through replication and through the automatic scheduling of healing operations in the event that the data storage service determines that a particular replica of data may be unavailable or damaged. In some embodiments, the data storage service provides data storage services to clients, for example, users, subscribers, or client applications that access the data storage service on behalf of users or subscribers. In providing durability and availability of data, the data storage service may store multiple replicas of stored data. For example, in storing tables of data, where tables may be divided into partitions, each table partition may be stored among multiple storage nodes included within the data storage service. In some embodiments, the data storage service may store two or more replicas as a replica group for each partition and maintain a table of metadata describing state information for each replica. In this example, the data storage service may include a process that may analyze the metadata and determine whether or not a particular replica, for some reason, is unavailable, unreliable, or otherwise not fit for storing a replica. In this example, upon determining that a replica needs to be replaced or restored, the data storage service may automatically, and without user intervention, dynamically schedule operations to heal or restore the partition to bring the number of reliable partitions back up to a satisfactory healthy state for the replica group, such as up to a specific number of replicas and/or location of replica for maintaining data durability and availability.

Figure 1A:
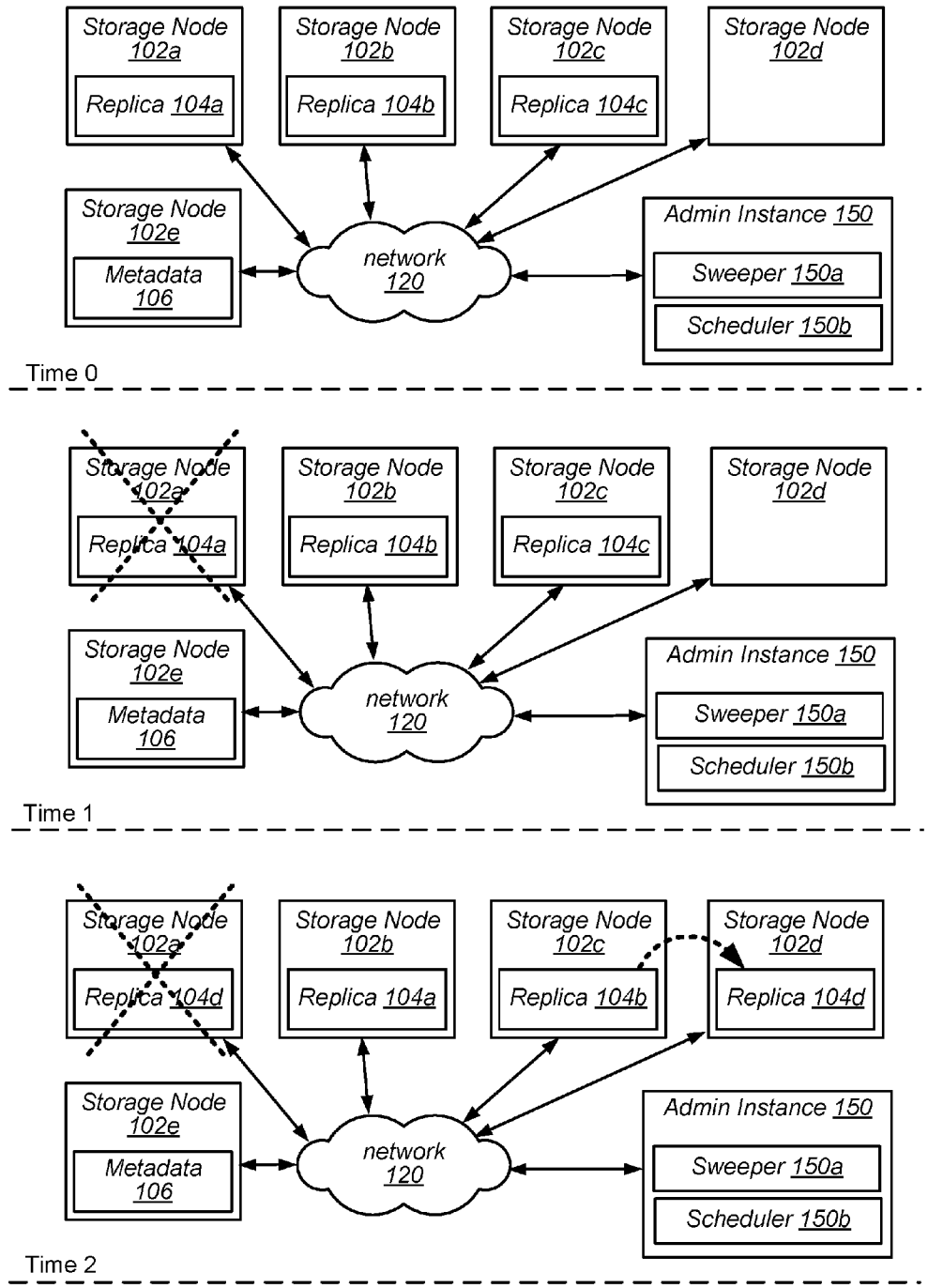
FIGS. 1A and 1B illustrate a data storage service computing environment, according to some embodiments.

As an example illustrated in FIG. 1A, a data storage service may maintain data for one or more storage clients. For instance, in at least some embodiments maintained data may be a partition of database table (or some other form of data). A number of replicas of the maintained data may be stored in different locations, such as on different storage nodes 102a-102c. These storage nodes themselves may, in some embodiments, be located at physically different locations (e.g., different data centers), or within different systems or collections of computing devices (e.g., different server fleets, availability zones, etc. . . . ). These replicas of the data may be collectively referred to as a replica group. In various embodiments, healthy state definition for each replica group may be enforced or maintained. For example, a healthy state definition may include a specified number of replicas for the replica group. These replicas may be defined to have certain numbers of replicas stored in different locations (as mentioned above). In various embodiments, a replica group that is not compliant with a healthy state definition for the replica group may be detected by determining or identifying that the total specified number of replicas is less than defined in the healthy state definition or that a number of replicas defined to be located in a particular location (e.g., data center). For instance, in this example, three replicas for the data are stored among storage nodes 102a-102c. Storage node 102a may be in location 1, and storage node 102b and 102c may be in location 2. Although not illustrated, the storage nodes themselves may be variously organized or arranged. A master storage node, for instance, may in some embodiments process various access requests for the data maintained by the storage nodes of the replica group.

A data storage service may also include an administrative module instance, admin instance 150, which may all communicate through network 120, and where admin instance 150 may include a variety of visibility or control functions or processes, such as sweeper process 150a and scheduler 150b, among others. Further description of the various functions, modules, and implementations of admin instance 150 are described in further detail below with regard to FIGS. 2A-2C.

Further in this example, as depicted at time 0, storage nodes 102a-102c may each store replicas of a given partition of a table, depicted as replicas 104a-104c, where storage node 102e may store metadata 106. Metadata 106 may include information regarding the status of each storage node, and sweeper 150a may periodically or aperiodically analyze the contents of metadata 106 to determine whether or not one or more replicas for a partition may need to be restored.

At this point in this example, as depicted at time 1, a storage node, storage node 102a may become unresponsive for any of a variety of reasons. For instance, storage node 102a may suffer a system failure or lose the ability to communicate across network 120. As a result of storage node 102a becoming unresponsive, metadata 106 may be updated, and sweeper 150a may analyze the updated metadata to determine that the replica group including the partition is not compliant with the healthy state definition for the replica group. For example, as not in the example above storage node 102a may be the only replica located at location 1. A healthy state definition may require or define that healthy replica group has at least one replica stored in a different location from other replicas. If storage node 102b and storage node 102c are located at location 2, then the replica group is not compliant with the healthy state definition for the replica group, and another replica should be restored on another storage node in a different location than location 2. Similarly, it may be determined that a replica group is not compliant with a healthy state definition for the replica group as the definition requires 3 replicas for a replica group, and thus another replica needs to be generated. An excommunication process, or other technique may be performed to disable the storage node 102a, and as part of this process, the status metadata for the process may be updated.

As depicted at time 2 in this example, the data storage service, in response to the determination that a replica of the partition should be restored, may schedule, according to scheduler 150b, one or more healing operations to generate a new replica of the partition. Upon completion of the scheduled healing operation, a replica of the partition may be stored on storage node 102d. Storage node 102 may be located such that the replica group is compliant with the healthy state definition for the replica group.

A replica healing operation may generally be any one or more operations that generate another replica of data maintained by a replica group. For instance, various ways of sending, copying, manipulating, transforming, or otherwise modifying the data maintained be incorporated as part of performing a replica healing operation. In various embodiments, a replica healing operation generates another replica on a different storage node, as illustrated in FIG. 1A, system, or device. This replica may not be, in some embodiments, an exact copy of the maintained data. For instance, various represent some form or version of the data maintained. For example, each replica may be shard or some other partition for maintaining durability that may not exactly share the same data, or each replica of the replica group may be useful to generate the maintained data. In at least some embodiments, a source node for the healing operation, storage node 102c, may send a copy, such as through network 120, to storage node 102d to store.

In different embodiments of the data storage service, how a replica is determined to unavailable and in need of replication may be accomplished in a variety of ways, such as described in more detail below with regard to FIGS. 3-5. Similarly, the process for scheduling creation of a replica once a replica is determined to be in need of replication may be accomplished according to various different criteria.

In some embodiments, the data storage service may support the seamless scaling of tables that are maintained on behalf of clients in a non-relational data store, for example, a non-relational database. In some embodiments, the data storage service itself may not impose a maximum table size or maximum throughput limits, and may not require client-side partitioning, even for tables having a massive scale. The data storage service may support automatic live repartitioning of data in response to the detection of various anomalies, which may include failure or fault conditions, hot spots, or increases in table size and/or service request throughput. In other cases, the data storage service may support explicit live repartitioning of data to support planned or anticipated table size and/or throughput increases, for example, proactive and/or subscriber initiated live partitioning. In other words, the data storage service may in some embodiments initiate the re-sizing, scaling, and/or repartitioning of a table in response to receiving one or more requests to store, retrieve, modify, or delete items in the scalable table.

Further, the data storage service described herein may in various embodiments support a flexible schema, a plurality of available consistency models, a variety of service level and/or business model options, multiple indexing options, and/or multiple query types. In some embodiments, clients (e.g., users, subscribers or client applications) may interact with the service through a Web service interface using a relatively small and relatively simple set of application programming interfaces (APIs), such that clients of the service are largely relieved from the burden of database administration. The service may exhibit low latency in servicing requests. Unlike in some prior data storage services, the service may provide predictable performance at a low cost, while supporting multi-tenancy and automatic heat management.

In various embodiments, the data storage service described herein may provide an API that includes support for some or all of the following operations on the data in a table maintained by the service on behalf of a client: put (or store) an item, get (or retrieve) one or more items having a specified primary key, delete an item, update the attributes in a single item, query for items using an index, and scan (e.g., list items) over the whole table, optionally filtering the items returned. In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

Figure 1B:
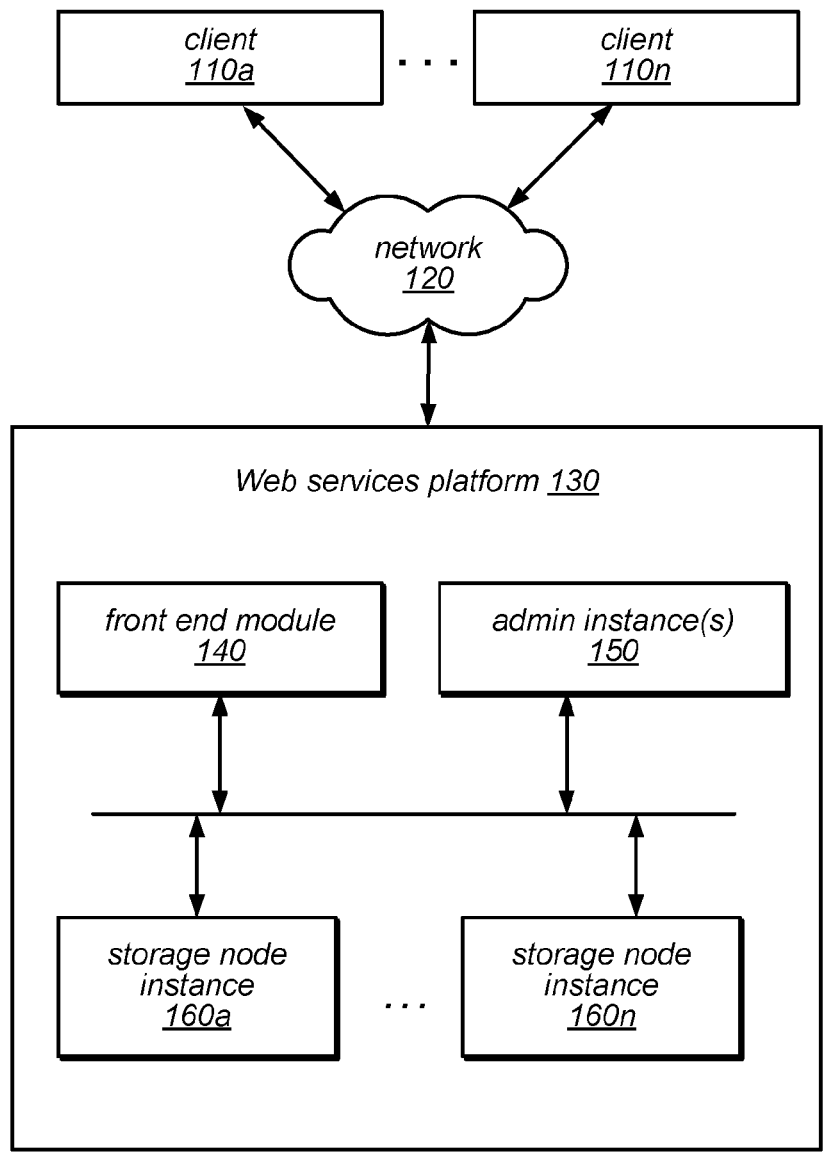

One embodiment of a system architecture that is configured to implement a data storage service is illustrated in FIG. 1B. In various embodiments, the components illustrated in FIG. 1B may be implemented directly within computer hardware, as instructions directly or indirectly executable by computer hardware (e.g., a microprocessor or computer system), or using a combination of these techniques. For example, the components of FIG. 1B may be implemented by a distributed system including a number of computing nodes (or simply, nodes), such as the computer node embodiment illustrated in FIG. 6 and discussed below. In various embodiments, the functionality of a given storage service system component may be implemented by a particular computing node or may be distributed across several computing nodes. In some embodiments, a given computing node may implement the functionality of more than one storage service system component.

In general, in regard to FIG. 1B, clients 110a-110n may encompass any type of client configurable to submit web services requests to Web services platform 130 via network 120. For example, a given client 110 may include a suitable version of a web browser, or a plugin module or other type of code module configured to execute as an extension to or within an execution environment provided by a web browser to provide clients (e.g., client applications, users, and/or subscribers) access to the data storage services provided by Web services platform 130. Alternatively, a client 110 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, client 110 may be an application configured to interact directly with Web services platform 130. In various embodiments, client 110 may be configured to generate web service requests according to a Representational State Transfer (REST)-style web services architecture, a document- or message-based web services architecture, or another suitable web services architecture.

In some embodiments, client 110 may be configured to provide access to web services-based storage to other applications in a manner that is transparent to those applications. For example, client 110 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to Web services platform 130 may be coordinated by client 110 and the operating system or file system on behalf of applications executing within the operating system environment.

Clients 110 may convey web services requests to and receive responses from Web services platform 130 via network 120. In various embodiments, network 120 may encompass any suitable combination of networking hardware and protocols necessary to establish web-based communications between clients 110 and platform 130. For example, network 120 may generally encompass the various telecommunications networks and service providers that collectively implement the Internet. Network 120 may also include private networks such as local area networks (LANs) or wide area networks (WANs) as well as public or private wireless networks. For example, both a given client 110 and Web services platform 130 may be respectively provisioned within enterprises having their own internal networks. In such an embodiment, network 120 may include the hardware (e.g., modems, routers, switches, load balancers, proxy servers, etc.) and software (e.g., protocol stacks, accounting software, firewall/security software, etc.) necessary to establish a networking link between given client 110 and the Internet as well as between the Internet and Web services platform 130. It is noted that in some embodiments, clients 110 may communicate with Web services platform 130 using a private network rather than the public Internet. For example, clients 110 may be provisioned within the same enterprise as the data storage service (and/or the underlying system) described herein. In such a case, clients 110 may communicate with platform 130 entirely through a private network 120 (e.g., a LAN or WAN that may use Internet-based communication protocols but which is not publicly accessible).

In general, Web services platform 130 may be configured to implement one or more service endpoints configured to receive and process web services requests, such as requests to access tables maintained on behalf of clients/users by a data storage service, and/or the items and attributes stored in those tables. For example, Web services platform 130 may include hardware and/or software configured to implement various service endpoints and to properly receive and process HTTP-based web services requests directed to those endpoints. In one embodiment, Web services platform 130 may be implemented as a server system configured to receive web services requests from clients 110 and to forward them to various components that collectively implement a data storage system for processing. In other embodiments, Web services platform 130 may be configured as a number of distinct systems (e.g., in a cluster topology) implementing load balancing and other request management features configured to dynamically manage large-scale web services request processing loads.

As illustrated in FIG. 1B, Web services platform 130 may include a front end module 140 (which may be configured to receive, authenticate, parse, throttle and/or dispatch service requests, among other things), one or more administrative components, or auto admin instances, 150 (which may be configured to provide a variety of visibility and/or control functions, as described in more detail below), and a plurality of storage node instances (shown as 160a-160n), each of which may maintain and manage one or more tables on behalf of clients/users or on behalf of the data storage service (and its underlying system) itself. Some of the functionality provided by each of these types of components is described in more detail below, according to various embodiments.

In various embodiments, Web services platform 130 may be configured to support different types of web services requests. For example, in some embodiments, platform 130 may be configured to implement a particular web services API that supports a variety of operations on tables that are maintained and managed on behalf of clients/users by the data storage service system (and/or data stored in those tables). Examples of the operations supported by such an API are described in more detail below.

In addition to functioning as an addressable endpoint for clients' web services requests, in some embodiments Web services platform 130 may implement various client management features. For example, platform 130 may coordinate the metering and accounting of client usage of web services, including storage resources, such as by tracking the identities of requesting clients 110, the number and/or frequency of client requests, the size of tables and/or items stored or retrieved on behalf of clients 110, overall storage bandwidth used by clients 110, class of storage requested by clients 110, and/or any other measurable client usage parameter. Platform 130 may also implement financial accounting and billing systems, or may maintain a database of usage data that may be queried and processed by external systems for reporting and billing of client usage activity. In some embodiments, platform 130 may include a lock manager and/or a bootstrap configuration (not shown).

In various embodiments, a data storage service may be implemented on one or more computing nodes that are configured to perform the functionality described herein. In some embodiments, the service may be implemented by a Web services platform (such as Web services platform 130 in FIG. 1) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources, which may be shared with other Web services or applications, in some embodiments.

Figure 2A:
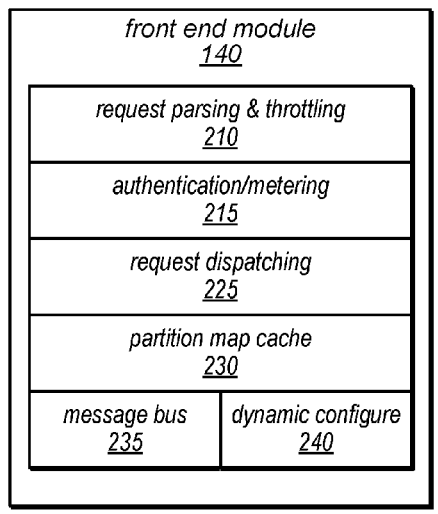
FIGS. 2A-2C illustrate additional details of some component elements of a data storage service, according to some embodiments.
Figure 2B:
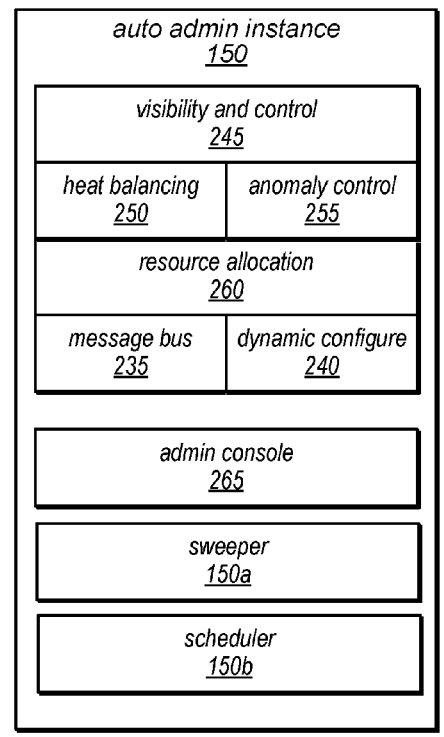
Figure 2C:
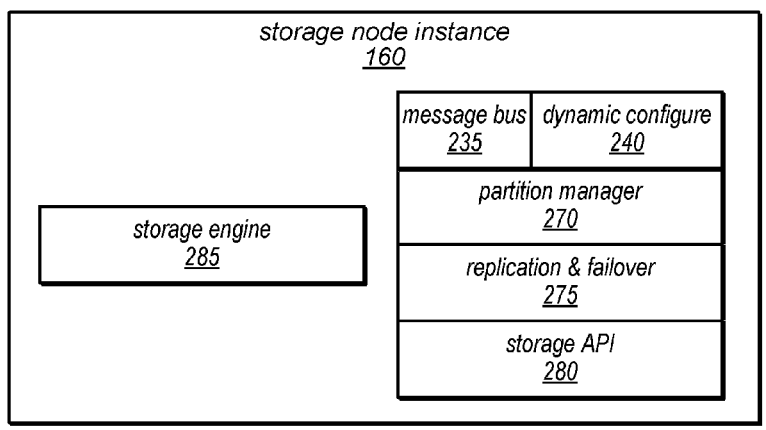

FIGS. 2A-2C illustrate various elements or modules that may be included in each of the types of components of Web services platform 130, according to one embodiment. As illustrated in FIG. 2A, front end module 140 may include one or more modules configured to perform parsing and/or throttling of service requests (shown as 210), authentication and/or metering of service requests (shown as 215), dispatching service requests (shown as 225), and/or maintaining a partition map cache (shown as 230). In addition to these component-specific modules, front end module 140 may include components that are common to multiple types of computing nodes that collectively implement Web services platform 130, such as a message bus (shown as 235) and/or a dynamic configuration module (shown as 240). In other embodiments, more, fewer, or different elements may be included in front end module 140, or any of the elements illustrated as being included in front end module 140 may be included in another component of Web services platform 130 or in a component configured to interact with Web services platform 130 to provide the data storage services described herein.

As illustrated in FIG. 2B, auto admin instance 150 may include one or more modules configured to provide visibility and control to system administrators (shown as 245), or to perform heat balancing (shown as 250), and/or anomaly control (shown as 255), resource allocation (shown as 260). Auto admin instance 150 may also include an admin console 265, through which system administrators may interact with the data storage service (and/or the underlying system). In some embodiments, admin console 265 may be the primary point of visibility and control for the data storage service (e.g., for configuration or reconfiguration by system administrators). For example, admin console 265 may be implemented as a relatively thin client that provides display and control functionally to system administrators and/or other privileged users, and through which system status indicators, metadata, and/or operating parameters may be observed and/or updated. In addition to these component-specific modules, auto admin instance 150 may also include components that are common to the different types of computing nodes that collectively implement Web services platform 130, such as a message bus (shown as 235) and/or a dynamic configuration module (shown as 240). In other embodiments, more, fewer, or different elements may be included in auto admin instance 150, or any of the elements illustrated as being included in auto admin instance 150 may be included in another component of Web services platform 130 or in a component configured to interact with Web services platform 130 to provide the data storage services described herein.

In at least some embodiments, auto admin instance 150 may implement sweeper 150*a*. Sweeper module 150*a* may be configured to examine, evaluate, or analyze a replica group status. For instance, in some embodiments, sweeper 150*a* may be configured to access, request, or update status metadata for one or more storage nodes of data storage service. Sweeper 150*a* may request status information, such as the availability of a replica stored on the storage node, from storage nodes. Sweeper 150*a* may also receive the status information and update metadata stored for a replica group, such as metadata 106 discussed above with regard to FIG. 1A. More generally, sweeper 150*a* may be configured to determine whether a number of available replicas for a replica group is not compliant with a healthy state definition for a replica group, such as whether the number of available replicas is than a specified number of replicas to be maintained for the replica group in one or more locations. Thus, if a replica group is specified to provide 4 replicas of data, and currently only 2 replicas of the data in the replica group are available, sweeper 150*a* may be configured to identify the deficient replica group. FIGS. 3 and 4, discussed in further detail below, provide many examples of the various methods and techniques sweeper 150*a* may employ to detect and identify deficient replica groups.

Auto admin instance 150 may also include, in various embodiments, a scheduler 150*b*. As noted above in FIG. 1A, scheduler 150*b* may be configured to dynamically schedule one or more heal operations to restore the number of available replicas for a replica group to compliance with a healthy state definition for the replica group based, at least in part, on one or more resource constraints for performing healing operations. Heal operations to restore deficient replica groups identified by sweeper 150*a* (or some other component/module) may be identified by some data structure, such as a queue. Scheduler 150*b* may dynamically determine an order in which to pick one or more heal operations from the data structure to be performed. In at least some embodiments, scheduler 150*b* may have a predetermined number of heal operations that may be performed concurrently. Heal operations may be picked from the data structure to replace completed heal operations.

In at least some embodiments, scheduler 150*b* may determine one or more resource restrictions for the data storage service. For instance, scheduler 150*b* may monitor network traffic or predict expected network traffic for one or more nodes of the data storage service. Various other kinds of resource restrictions may be identified or determined, as discussed below with regard to FIG. 5, including, but not limited to network bandwidth, processor and/or computing resources/capacities, storage space, and concurrent/parallel operation limitations. Scheduler 150*b*, may also be configured to determine one or more resource requirements for heal operations. For instance, one or more heal operations may be queued for performance, and scheduler 150*b* may evaluate each of the heal operations to determine the one or more resource requirements for each heal operation. Resource requirements may include a replica source and replica destination, amount of data in the replica, or any other computing/processing resource useful to create the new replica on the target node. Various forms of encryption, formatting, compression, or other manipulation of the data of a replica may be implemented when creating a new replica from an current replica. Based, at least in part, on the resource requirements of the heal operations, scheduler 150*b* may order the heal operations without exceeding the identified resource requirements for the data storage service. Scheduler 150*b* may also take other considerations into ordering or scheduling heal operations. Access frequency for replica groups, such as the volume or rate of read requests for a particular replica group, may also be used to order heal operations. Those replica groups, for instance, that are frequently accessed may have heal operations performed to restore them before replica groups that are less frequently accessed. Scheduler 150b may apply a variety of different methods and techniques, as discussed below with regard to FIG. 5. A load balancing scheme, for example, may be used to create the order of heal operations within resource restrictions of the data storage service.

As illustrated in FIG. 2C, storage node instance 160 may include one or more modules configured to provide partition management (shown as 270), to implement replication and failover processes (shown as 275), and/or to provide an application programming interface (API) to underlying storage (shown as 280). As illustrated in this example, each storage node instance 160 may include a storage engine 285, which may be configured to maintain (i.e. to store and manage) one or more tables (and associated table data) in storage 280 (which in some embodiments may be a non-relational database) on behalf of one or more clients/users. In addition to these component-specific modules, storage node instance 160 may include components that are common to the different types of computing nodes that collectively implement Web services platform 130, such as a message bus (shown as 235) and/or a dynamic configuration module (shown as 240). In other embodiments, more, fewer, or different elements may be included in storage node instance 160, or any of the elements illustrated as being included in storage node instance 160 may be included in another component of Web services platform 130 or in a component configured to interact with Web services platform 130 to provide the data storage services described herein.

The systems underlying the data storage service described herein may store data on behalf of clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique.

Detailed Description Considerations

Within the detailed description, numerous details are set forth to provide a thorough understanding of the claimed subject matter. However, it will be understood by those skilled in the art that the claimed subject matter may be practiced without these specific details. In other instances, methods, apparatus or systems that would be known by one of ordinary skill have not been described in detail so as not to obscure claimed subject matter.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task or tasks at issue.

As used herein, the terms "first", "second", and so on are used as labels for nouns that they precede, and do not imply any type of ordering, for example, spatial, temporal, or logical, among others. For example, in a display environment having multiple display devices, the terms "first" and "second" display devices can be used to refer to any two of the multiple display devices. In other words, the "first" and "second" display devices are not limited to logical display devices 0 and 1.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to".

Workflows of Dynamically Detecting and Healing Deficient Replica Groups

As noted above, various types of storage systems, such as the data storage service depicted in FIGS. 1a-2c, may implement dynamically detecting and healing replica groups maintaining data for storage. Replica groups may provide durability and availability for stored data, such as data maintained on behalf of many different and/or distinct clients. In different cases, the data being stored may be any type of data, including a variety of different data types, formats, in compressed/encrypted forms, that may be structured or unstructured data, such as in a table. In one example embodiment, one or more clients may store tables of data, and a data storage service may divide each table into multiple partitions and store multiple replicas of each table partition among nodes within the data storage service. In this embodiment, a storage node may operate independently of other storage nodes, and replicas for a given table may be stored on different storage nodes, where the different storage nodes may be spread geographically across different data centers.

Complying with a healthy state definition for a replica group may be implemented to ensure that the replica group continues to provide durability for stored data. As part of ensuring that replica groups continue to comply with healthy state definition replica groups that become deficient, such as due to storage node failure or other type of system failure or error that reduces the number of available replicas, may be detected and restored to be compliant with the healthy state definition via a replica healing operation. FIG. 3 is a high-level flowchart illustrating a method to dynamically detect and heal replica failures, according to some embodiments.

As indicated at 302, status metadata for one or more replica groups may be accessed. This status metadata may provide an indication of the health or status of the storage nodes or other systems or devices storing the replicas of the replica group. For instance, status metadata may indicate whether a particular storage node is responding to or available to various requests from other nodes implemented by a data storage service, such as by storing performance metrics of storage node (responding to access requests, queries, and/or other operations). Similarly, various other indicators or information may be stored about a particular replica group, such as the organization of systems or devices storing the replicas (e.g., location/address of storage nodes, if a particular storage node is master storage node, etc. . . . ) as well as information about the data maintained by the replica group (e.g., type, format, table which the partition belongs to, etc. . . . ). In at least some embodiments, status metadata may be stored as a table on a storage node of a data storage service, as illustrated in FIG. 1A. However, various other structures, arrangements, or locations of the status data may be used. For example, the status metadata may be maintained in different locations for each replica group, such as on a master node for the replica group.

The status metadata may be updated in various circumstances, such as when status or health information is received from systems or devices storing replicas for the replica groups, or other systems or devices that manage, administer, or monitor the replica groups. For example, in some embodiments, storage nodes may send or report various status or health information to the location where status metadata for the replica group is maintained (or to another system, module, or device, such as sweeper 150a in FIG. 1A, that updates status metadata), periodically or aperiodically. In another example, a master node, or other device such as sweeper module 150 in FIG. 1A, may request status or health information from a storage node, or other system or device storing a replica of a replica group. This request may be made when it is determined that the storage node may be unavailable or unresponsive. Consider the scenario where storage nodes regularly send status information to update status metadata for replica groups. If, when accessing metadata, it is determined that a particular storage nodes has not sent status information within some expected window of time, then a request for status information may be sent to the storage node.

Accessing status metadata may be performed as part of a polling or scanning process or technique, such as by sweeper 150a in FIG. 1A, or some other system or device. In some embodiments, the status metadata may be accessed periodically, for example at certain points in time, continually, or as part of some background process that access the metadata when doing so does not impede foreground processing operations (such as responding to access requests). FIG. 4 illustrates one such technique for accessing status metadata to detect deficient replica groups. As depicted at 402, metadata may be accessed for a particular replica group. For example, each metadata entry in a table of status metadata for the replica groups of a data storage service may iteratively examined. In this example, a first metadata entry may be considered, which may correspond to a particular replica group. In this case, the data storage service may read or access metadata information for the current replica being considered or analyzed and determine whether or not there are enough available or healthy replicas for the particular replica group, as depicted at 404.

If, as depicted at 404, it is determined from the status metadata for the particular replica group that there are insufficient available or healthy replicas within the particular replica group, such as defined by a healthy state definition for the replica group, the particular replica group may be identified for one or more healing operations, as indicated at 406, to restore the replica group to the healthy state definition, such as to a specified number of replicas for the replica group. Then, metadata for additional replica groups may be selected, as indicated at 408.

If, as depicted at 404, the number of available or healthy replicas for the particular is determined to be sufficient, it may then be determined whether there are additional replica groups with status metadata stored, and which may be analyzed, as indicated at 408. If there is status metadata for another replica group to analyze (e.g., for a replica group that has not yet been evaluated), then processing may continue at 402, and otherwise, processing may continue to 410, where a time interval or some other event may occur before accessing status metadata for the replica groups again. In some embodiments, the data storage service may, instead of waiting for a next scheduled metadata check, iterate over the status metadata to confirm the accuracy of the contents. In other embodiments, the data storage service may, instead of waiting for a next scheduled metadata check, begin immediately iterating over the status metadata at 402.

Figure 3:
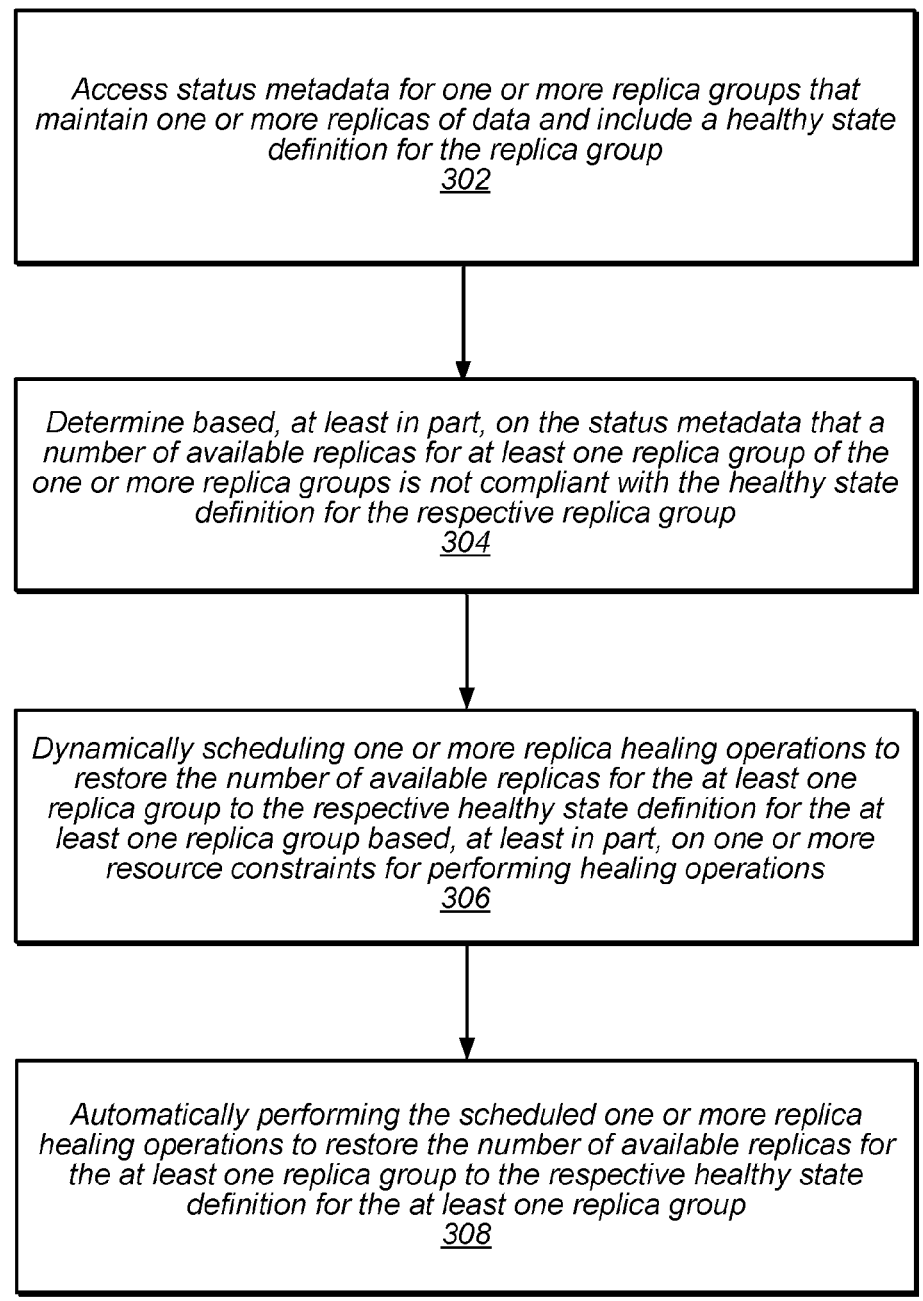
FIG. 3 is a high-level flowchart illustrating a method to dynamically detect and heal replica failures, according to some embodiments.

In some embodiments, the data storage service may implement a process to check the status of computing nodes and/or replicas and to correspondingly update the metadata, and another process for analyzing the metadata to determine that a healing operation should be scheduled, as illustrated at elements 302 and 304 in FIG. 3. However, in other embodiments, these functions may be combined into a single process. For example, in other embodiments, a process that checks the status of computing nodes may directly initiate the scheduling of a healing operation in response to determining that a computing node is unresponsive or otherwise in need of being replicated.

Returning to FIG. 3, as previously stated, a number of replicas of the data may be specified for a replica group to maintain. In various embodiments, a determination based, at least in part, on accessed status metadata for the replica groups may be made as to whether the number of available replicas for at least one of the replica groups is not compliant with the healthy state definition for the respective replica group. 304. As noted above, a healthy state definition may provide a definition of or requirements for a healthy replica group. A specified number of replicas may be provided for the replica group. Similarly, various locations or states for the replica group may also be defined. Diversity in location, for instance, may be one requirement, such that in one example at least two different locations, with a minimum number of replicas may be required. Various other configurations or arrangements of a healthy state definition may be constructed, and thus, the previous examples are not intended to be limiting. A master node may, for example, be required to be located in a different data center than other storage nodes storing replicas for the replica group. in some embodiments an unavailable replica may be an unhealthy replica. An unhealthy state for a replica may be any state not within certain parameters. For example, if storage node is responding slower than what a client expects, the storage node may be determined, counted, or identified as unavailable, even though the storage node is responsive and functional. In such a case, an indication that the replica for the replica group on this storage node is deemed unavailable and may be stored within the status metadata for the replica group. In other examples, an unavailable replica may be stored on a storage node, system, or device that may have suffered a system failure, such as a physical failure or a software failure, and therefore be unresponsive. In this case, the status metadata stored for the replica group may indicate corresponding status information such as a computing node not operating within specified parameters or the computing node not being responsive at all.

In various embodiments, one or more replica healing operations may be dynamically scheduled to restore the number of available replicas for the at least one replica group to the respective healthy state definition for the at least one replica group based, at least in part, on one or more resource constraints for performing healing operations, as indicated at 306. Scheduling replica healing operations may be performed dynamically, such as in response to changing conditions on a data storage service implementing replica groups. For example, in some embodiments, replica healing operations may be performed as part of a background process. When resources are available to initiate or increase the amount of resources committed to performing the replica healing operations change, the number of healing operations that may be performed (e.g., concurrently) or the specific requirements of the healing operations (e.g., a less resource intensive replica healing operation may be selected over a more resource intensive replica healing operation) may also change. A dynamic scheduling technique may therefore account for the changing conditions of performing replica healing operations.

Various methods or techniques may be implemented to dynamically schedule one or more replica healing operations. Various different criteria, restrictions, or requirements may be accounted for when scheduling healing operations. For instance, replica healing operations for replica groups that are frequently accessed may be prioritized over replica healing operations for replica groups that less frequently accessed. In another example, a network-bandwidth restriction may delay the scheduling of one or more replica healing operations that involve transfer a large amount of data.

Figure 5:
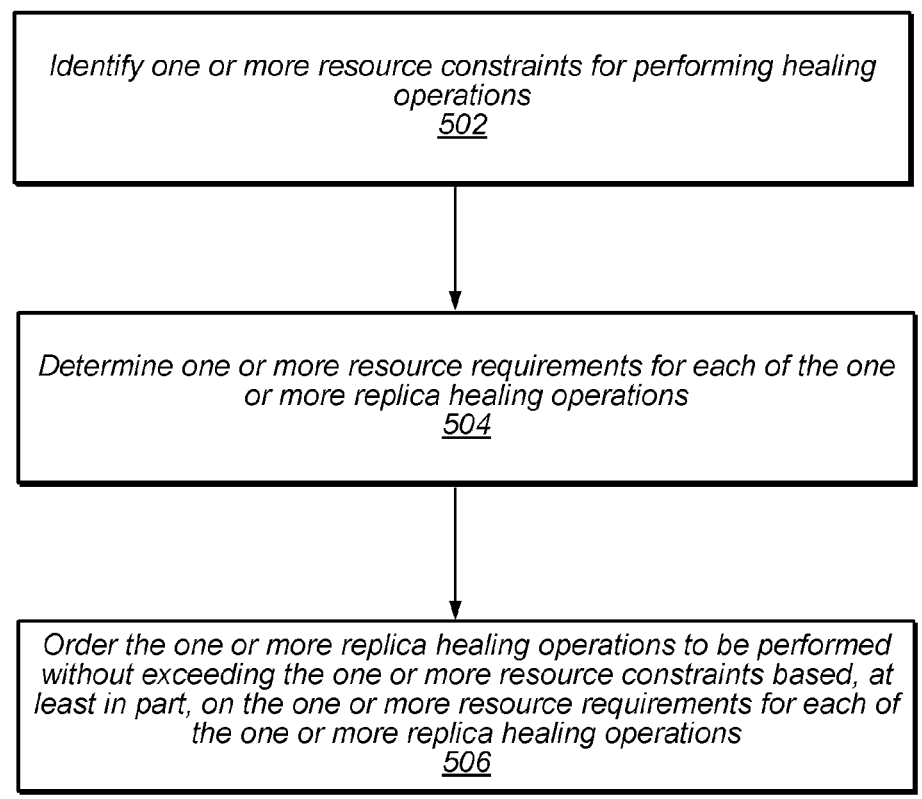
FIG. 5 is a high-level flowchart illustrating various methods to dynamically schedule replica healing operations, according to some embodiments.

FIG. 5 is a high-level flowchart illustrating various methods to dynamically schedule replica healing operations, according to some embodiments. As indicated at 502, in some embodiments one or more resource constraints for performing healing operations may be identified. Resource constraints may include a variety of different storage node, system, device, network, or more generally any other hardware/software resource limitations. In some embodiments, for example, a predicted or expected network traffic load may be determined for one or more components of storage system (e.g., a node, replica group, etc. . . . ). This expected or predicted network traffic load may act as a resource constraint, limiting the resources available to perform healing operations that would inhibit the performance or preclude other operations, such as access requests or other foreground operations. Similarly, another resource constraint may be the number of concurrent operations at a given node, system or device. For example, in some embodiments, a concurrent healing threshold may allow a limited or single number of replica healing operations to be performed on storage node at a time. Thus, if only one healing operation may be performed, then a storage node may be limited to either receiving a new replica to persist as part of a healing operation, or sending a copy of a replica to persist as part of a healing operation.

Another example of a resource constraint may be a global number of replica healing operations that may be performed at once. For example, if 30 replica healing operations slots are available for replica healing operations at a given time, then newly identified replica healing operations may be delayed until a healing operation slot becomes available. Other examples include, processing resources, such as the processing or computing resources required package, copy, modify, manipulate, and/or send data to generate a new replica for a replica group, or available storage space on a storage node. As many different resource constraints may be envisioned, the above examples are not intended to be limiting.

In some embodiments, as indicated at 504, one or more resource requirements for each of the one or more replica healing operations may be determined. Resource requirements may include, but are not limited to, the amount of data to be replicated, the amount of computing, and/or processing resources to copy, package, send, etc. . . . the replica, the replica healing operation source (e.g., the nodes, system, or device storing a replica that will be copied to create a new replica), and the replica healing operation destination. In various embodiments, each replica healing operation may have one or more replica healing operation sources and one or more replica healing operation destinations. To determine these resource requirements various types of information may be evaluated, such as metadata for the replica group, or the data associated with a replica healing operation request. Some resource requirements for replica healing operations may vary from one replica healing operation to another, while other resource requirements may be the same for all replica healing operations.

As indicated at 506, the one or more replica healing operations may be ordered to be performed without exceeding the one or more resource constraints. This ordering may be based, at least in part, on the one or more resource requirements for each of the one or more replica healing operations. A load-balancing scheme may, for instance, be applied to distribute the network load or traffic utilized for replica healing operations to ensure that replica healing operations are performed without exceeding any bandwidth or other resource requirements. Similarly, various concurrent operation constraints or thresholds may be applicable to determining the ordering. For example, in some embodiments, the number of concurrent replica healing operations performed by a given storage node may be limited to one. If two or more replica healing operations use as part of the replica healing operation a given storage node as either a source or destination, then the concurrent healing operation restraint may be applied to order one replica healing operation such that the conflicting replica healing operation is completed prior to performing.

Various other considerations may be taken into account when ordering the one or more replica healing operations. Access frequency, for example, of a particular replica group in various embodiments may be used as part of ordering the one or more replica healing operations. More frequently accessed replica groups may have replica healing operations directed toward the replica group performed prior to those replica healing operations for replica groups accessed less frequently. In some embodiments, various other considerations such as service level agreements (maintaining a certain number of replicas or repairing/healing replicas within a certain amount of time) or any other consideration that may require an expedited or accelerated performance of a replica healing operation (e.g., when the number of available replicas fall below a critical durability threshold—such as only 1 replica). In some embodiments, the varying resource constraints, restrictions, and/or criteria used to determine an ordering of replica healing operations may be configurable by a system administrator, client, or other user, such as by limiting an amount of network bandwidth used, or adding or removing constraints, restrictions, and criteria to consider when scheduling.

Returning to FIG. 3, in various embodiments, the scheduled one or more replica healing operations may be performed automatically, as indicated at 308. Various components may be directed to perform the replica healing operations as scheduled, such as by a master node, or by auto admin instance 150, described above in FIGS. 1*b* and 2. Various command messages may be sent requesting that a storage node, system or device storing a source replica, to copy/send the replica to another storage node, system, or device. In at least some embodiments, replica healing operations may be performed as part of a background process, such that foreground processes (e.g., access requests) may not be impeded. Therefore, the replica healing operations may minimize performance impacts on operations explicitly requested by a client, user, or some other higher priority process or operation. For example, the data storage service may limit healing operations so that they do not occupy more than a threshold quantity of system resources, such as computational resources or storage resources or network bandwidth. These threshold limitations may be adjustable at any point, for example, through settings specified from a system administration interface.

In some embodiments, prior to a queued healing operation request being performed, the data storage service may query the unavailable node for a replica queued up to be healed to confirm the validity of the healing operation request. This additional check of a storage node may detect that a computing node may be available/healthy again and therefore the corresponding healing operation or operations for replicas stored on the computing node may be removed from the scheduling queue. This example may avoid unnecessary healing operations being performed if the computing node in this example became unavailable for a temporary reason such as a computing node reboot or a lost and restored network connection.

Figure 4:
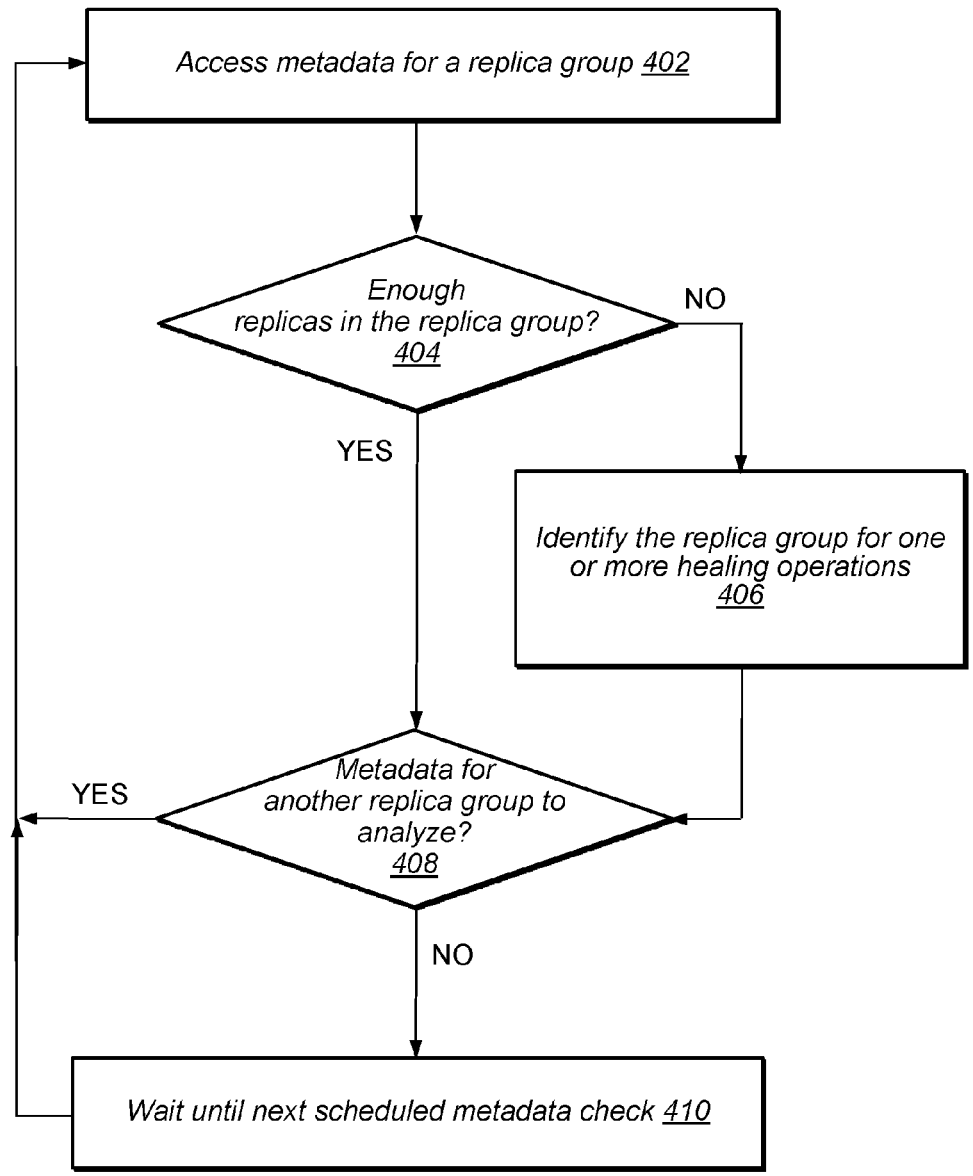
FIG. 4 is a high-level flowchart illustrating various methods and techniques for accessing status metadata, according to some embodiments.

Although described more generally above in FIGS. 3-5, in some embodiments, such as those implemented as part of a data storage service, a queue may be implemented to hold healing operation requests. The data storage service, or a scheduling process of the data storage service, may prioritize and shuffle the order of healing operation requests based on different criteria. As example criteria, the data storage service may prioritize healing operation requests for computing nodes that have a high amount of traffic or read or write requests above healing operation requests for computing nodes that have a smaller amount of traffic or read or write requests.

In other embodiments, the data storage service may move healing operation requests from their position in the queue, where the position in the queue corresponds to the order in which the healing operation is performed, based on conflicts between queued healing operations. For example, it may be the case that different replicas on a single computing node may need to be replicated, however, the data storage system may not be able to concurrently read these different replicas from the same storage node. In such a case, one of the healing operations corresponding to one of the replicas on the storage node may be moved down in the queue to a point where when the data storage service begins the moved down healing operation request, the conflicting healing operation request would be completed.

In other embodiments related to resource conflict avoidance, the data storage service may avoid creating a replica for some given replica group on the same computing node that is the source for some other, ongoing healing operation. In such a scenario, the ability for healing operations to be performed in parallel would be eliminated and therefore, if one of the conflicting replica healing operations is delayed, another healing operation that may be performed in parallel may be performed.

In some embodiments, the data storage service may restrict a quantity of concurrent healing operations according to network bandwidth usage, which may be a configurable restriction. For example, if the data storage service determines that current time network traffic is light as compared to some future point in time within some period of time, then the data storage service may execute a healing operation at the current time. In other examples, the data storage service, based on a determination of network traffic expectations, may schedule healing operations with small network traffic overhead at points in time when heavier network traffic is expected and may schedule healing operations with large network traffic overhead when lighter network traffic is expected.

In other embodiments, the data storage service may prioritize queued healing operation requests based on customer service level agreements or requirements. For example, a service client may pay for a higher durability model of data storage, which may include a specification that data for this service client be stored using a certain number of replicas. In this example, the data storage service may schedule a healing operation the get the higher durability model restored to the specified number of replicas above the priority for scheduling a healing operation to get a lower durability model restored to a specified number of replicas.

In some embodiments, it may be the case that a replica is created unnecessarily, which may bring the number of replicas in a replica group above the number of replicas expected in the replica group. In such a case, the data storage service may schedule a healing operation to bring down the number of replicas to the number of replicas specified to be in the replica group with a lower priority that a healing operation to bring up the number of replicas to the number of replicas specified to be in the replica group.

In at least some embodiments, a replica group may be organized such that the replica group has a computing node designated as a master node. The master node may perform, some or all of the elements depicted in the various FIGS. 3-5. In some embodiments, the master node may determine that a given computing node of the replica group may become unavailable or otherwise fails to satisfy performance or storage parameters. In response to such a determination, the master node may update the status metadata for the replica group (or groups) directly or communicate with a process that updates the metadata. In other examples, the master node may directly submit a healing operation into a queue that is read by a scheduling process for healing operations. Further in this example, a data storage service may include protocols for other computing nodes in a replica group to assume the master node role in the case that the master node for a replica group becomes unavailable or suffers from some type of fault. Further, in some embodiments, each time a table is created or some other type of data is stored according to a request from a client user, a data storage service may update the status metadata to include replica information for the replicas of the newly stored table or other type of data. This update, as discussed above, may be performed according to an update message from a master node of a replica group or the update may be performed according to an update message from a write process creating the replicas.

Example Computer System

Figure 6:
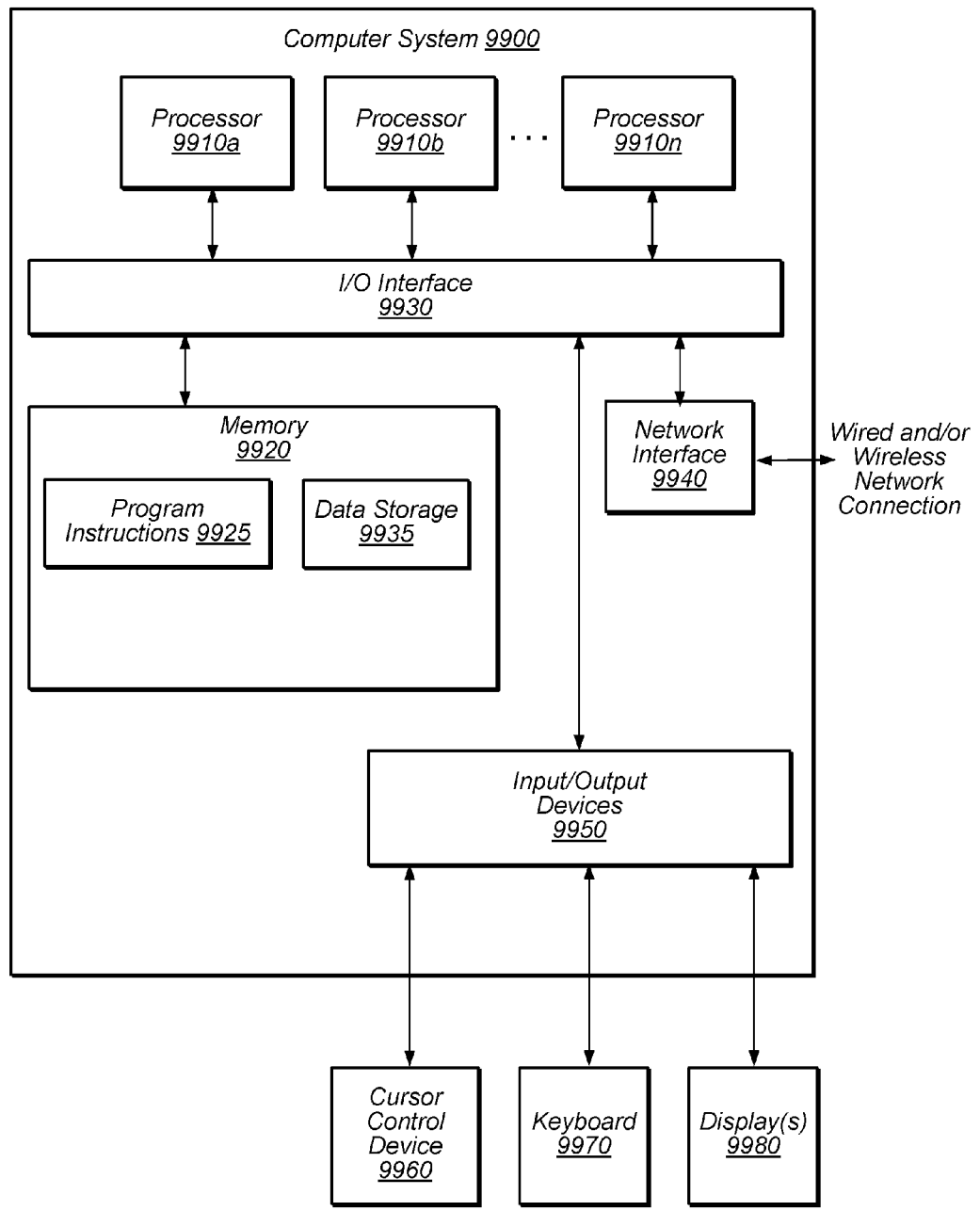
FIG. 6 depicts selected elements of an example computer system capable of implementing the various embodiments of a data storage service, according to some embodiments.

FIG. 6 illustrates computer system 9900 that may execute the embodiments discussed above. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, computer system 9900 includes one or more processors 9360a-9360n coupled to system memory 9370 via input/output (I/O) interface 9380. The computer system further includes network interface 9390 coupled to I/O interface 9380, and one or more input/output devices 9382, such as cursor control device 9960, keyboard 9970, and one or more displays 9980. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented with program instructions configured for execution on one of, or parallel execution on two or more of, such GPUs. The GPU(s) may implement one or more application programmer interfaces (APIs) that permit programmers to invoke the functionality of the GPU(s).

System memory within the computer system may be configured to store program instructions and/or data accessible from a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data may implement desired functions, such as those described above for the various embodiments are shown stored within system memory 9370 as program instructions 9925 and data storage 9935, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted from transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for another component to use. In some embodiments, the I/O interface may include support for devices attached through various types of peripheral buses. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data from one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement each of the embodiments described herein. In one embodiment, the program instructions may include software elements of embodiments of the modules discussed earlier. The data storage within the computer system may include data that may be used in other embodiments. In these other embodiments, other or different software elements and data may be included.

Those skilled in the art will appreciate that the computer system is merely illustrative and is not intended to limit the scope of the embodiments described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality depicted within the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored on a computer-accessible medium or a portable article to be read from an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. A non-transitory, computer-readable storage medium may include storage media or memory media such as magnetic or optical media such as disks or DVD/CD-ROM, volatile or non-volatile media such as RAM, ROM, and flash drives. More generally, computer-accessible or computer-readable storage media may also include transmission media or signals such as electrical, electromagnetic, or digital signals, conveyed via a communication medium such as network and/or a wireless link.

The various methods described herein represent example embodiments of methods. These methods may be implemented in software, hardware, or through a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a plurality of compute nodes, each comprising at least one processor and memory, wherein the plurality of compute nodes implement a data store;
wherein the data store is configured to:
maintain a plurality of replicas of data on behalf of a client of the data store at different ones of the compute nodes as a replica group for the data;
obtain individual metadata for different replicas of the replica group to update status metadata stored for the replica group at one or more of the compute nodes remote from the different ones of the compute nodes that maintain the plurality of replicas;
access, by a replica group status sweeper remote from the different ones of the compute nodes and remote from the one or more compute nodes that store the status metadata, the updated status metadata for the replica group at the one or more compute nodes to evaluate the replica group for compliance with a healthy state definition of a number of replicas for the replica group based, at least in part, on the updated status metadata, wherein the evaluation determines that a number of available replicas for the replica group is not compliant with the healthy state definition; and
automatically restore the replica group such that the number of available replicas for the replica group is compliant with the healthy state definition for the replica group.

2. The system of claim 1, wherein to obtain the individual metadata for different replicas of the replica group to update the status metadata, the data store is configured to send, by the different replicas of the data, the individual metadata to the one or more compute nodes to store the individual metadata as part of the status metadata.

3. The system of claim 1,
wherein one of the replicas in the replica group is a master replica for the replica group;
wherein to obtain the individual metadata for different replicas of the replica group to update the status metadata, the data store is configured to:
request, by the master replica, the individual metadata for the different replicas of the replica group; and
update, by the master replica, the status metadata according to the individual metadata received from the different replicas.

4. The system of claim 1,
wherein to obtain the individual metadata for different replicas of the replica group to update the status metadata, the data store is configured to:
request, by the replica group status sweeper, the individual metadata for the different replicas of the replica group; and
update, by the replica group status sweeper, the status metadata according to the individual metadata received from the different replicas.

5. The system of claim 1, wherein to evaluate the replica group for compliance with a healthy state definition of a number of replicas for the replica group, the data store is configured to:

determine that the individual metadata for one or more replicas of the replica group has not been updated in the status metadata within a time threshold;
send a request for the individual metadata to the one or more replicas; and
identify the one or more replicas as unavailable upon a failure of the one or more replicas to respond to the request.

6. The system of claim 1, wherein the data store is further configured to:
prior to the performance of the automatic restoration:
attempt to obtain current metadata for one or more replicas of the replica group determined to be unavailable according to the evaluation of the status metadata; and
based, at least in part, on the attempt to obtain the current metadata, confirm performance of the automatic restoration, wherein unconfirmed automatic restorations at the data store are not performed.

7. The system of claim 1,
wherein the data store is a network-based storage service, wherein the replica group is one of a plurality of different replica groups for different respective data maintained at the network-based storage service among the compute nodes;
wherein the network-based storage service is further configured to perform the obtainment of the individual metadata, the access of the status metadata, and the automatic restoration for one or more other replica groups in addition to the replica group; and
wherein the performance of the automatic restoration for the replica group and the one or more other replica groups is ordered according to a dynamically determined schedule for performing the automatic restorations based, at least in part, on one or more resource constraints in the network-based storage service.

8. A method, comprising:
performing, by a plurality of computing devices:
maintaining a plurality of replicas of data on behalf of a client of a data store at different ones of a plurality of compute nodes as a replica group for the data;
obtaining individual metadata for different replicas of the replica group to update status metadata stored for the replica group at one or more of the compute nodes remote from the different ones of the compute nodes;
accessing, by a replica group status sweeper that is remote from the different ones of the compute nodes and remote from the one or more compute nodes that store the status metadata, the updated status metadata for the replica group at the one or more compute nodes to evaluate the replica group for compliance with a healthy state definition of a number of replicas for the replica group based, at least in part, on the updated status metadata, wherein the evaluation determines that a number of available replicas for the replica group is not compliant with the healthy state definition; and
automatically restoring the replica group such that the number of available replicas for the replica group is compliant with the healthy state definition for the replica group.

9. The method of claim 8, wherein the obtaining the individual metadata for different replicas of the replica group to update the status metadata, comprises sending, by the different replicas of the data, the individual metadata to the one or more compute nodes to store the individual metadata as part of the status metadata.

10. The method of claim 8,
wherein one of the replicas in the replica group is a master replica for the replica group;
wherein the obtaining the individual metadata for different replicas of the replica group to update the status metadata, comprises:
requesting, by the master replica, the individual metadata for the different replicas of the replica group; and
updating, by the master replica, the status metadata according to the individual metadata received from the different replicas.

11. The method of claim 8,
wherein the obtaining the individual metadata for different replicas of the replica group to update the status metadata, comprises:
requesting, by the replica group status sweeper, the individual metadata for the different replicas of the replica group; and
updating, by the replica group status sweeper, the status metadata according to the individual metadata received from the different replicas.

12. The method of claim 8, wherein evaluating the replicas for the replica group, comprises:
determining that the individual metadata for one or more replicas of the replica group has not been updated in the status metadata within a time threshold;
sending a request for the individual metadata to the one or more replicas; and
identifying the one or more replicas as unavailable upon a failure of the one or more replicas to respond to the request.

13. The method of claim 8, further comprising:
prior to automatically restoring the replica group:
attempting to obtain current metadata for one or more replicas of the replica group determined to be unavailable according to the evaluation of the status metadata;
based, at least in part, on the attempt to obtain the current metadata, confirming performance of the automatic restoration, wherein unconfirmed automatic restorations at the data store are not performed.

14. The method of claim 8,
wherein the data store is a network-based storage service, wherein the replica group is one of a plurality of different replica groups for different respective data maintained at the network-based storage service among the compute nodes;
wherein the method further comprises performing the obtaining of the individual metadata, the accessing of the status metadata, and the automatically restoring for one or more other replica groups in addition to the replica group; and
wherein the performance of the automatic restoration for the replica group and the one or more other replica groups is ordered according to a dynamically determined schedule for performing the automatic restorations based, at least in part, on one or more resource constraints in the network-based storage service.

15. A non-transitory, computer-readable storage medium, storing program instructions that when executed by a plurality of computing devices implement a data storage service that implements:

maintaining a plurality of replicas of data on behalf of a client of a data store at different ones of a plurality of compute nodes as a replica group for the data;
obtaining individual metadata for different replicas of the replica group to update status metadata stored for the replica group at one or more of the compute nodes remote from the different ones of the compute nodes;
accessing, by a replica group status sweeper that is remote from the different ones of the compute nodes and remote from the one or more compute nodes that store the status metadata, the updated status metadata for the replica group at the one or more compute nodes to evaluate the replica group for compliance with a healthy state definition of a number of replicas for the replica group based, at least in part, on the updated status metadata, wherein the evaluation determines that a number of available replicas for the replica group is not compliant with the healthy state definition; and
automatically restoring the replica group such that the number of available replicas for the replica group is compliant with the healthy state definition for the replica group.

16. The non-transitory, computer-readable storage medium of claim 15, wherein, in obtaining the individual metadata for different replicas of the replica group to update the status metadata, the program instructions cause the one or more computing devices to implement sending, by the different replicas of the data, the individual metadata to the one or more compute nodes to store the individual metadata as part of the status metadata.

17. The non-transitory, computer-readable storage medium of claim 15,
wherein one of the replicas in the replica group is a master replica for the replica group;
wherein, in obtaining the individual metadata for different replicas of the replica group to update the status metadata, the program instructions cause the one or more computing devices to implement:
requesting, by the master replica, the individual metadata for the different replicas of the replica group; and
updating, by the master replica, the status metadata according to the individual metadata received from the different replicas.

18. The non-transitory, computer-readable storage medium of claim 15,
wherein, in obtaining the individual metadata for different replicas of the replica group to update the status metadata, the program instructions cause the one or more computing devices to implement:
requesting, by the replica group status sweeper, the individual metadata for the different replicas of the replica group; and
updating, by the replica group status sweeper, the status metadata according to the individual metadata received from the different replicas.

19. The non-transitory, computer-readable storage medium of claim 15, wherein, in evaluating the replicas for the replica group, the program instructions cause the one or more computing devices to implement:
determining that the individual metadata for one or more replicas of the replica group has not been updated in the status metadata within a time threshold;
sending a request for the individual metadata to the one or more replicas; and identifying the one or more replicas as unavailable upon a failure of the one or more replicas to respond to the request.

20. The non-transitory, computer-readable storage medium of claim 15, wherein the program instructions cause the one or more computing devices to further implement:
prior to automatically restoring the replica group:
attempting to obtain current metadata for one or more replicas of the replica group determined to be unavailable according to the evaluation of the status metadata;
based, at least in part, on the attempt to obtain the current metadata, confirming performance of the automatic restoration, wherein unconfirmed automatic restorations at the data store are not performed.

* * * * *